(12) United States Patent
Li et al.

(10) Patent No.: US 10,542,268 B2
(45) Date of Patent: Jan. 21, 2020

(54) SYSTEM FOR VIDEO COMPRESSION (71) Applicants: Advanced Micro Devices, Inc., Sunnyvale, CA (US); ATI Technologies ULC, Markham (CA)

(72) Inventors: Haibin Li, Shanghai (CN); Zhen Chen, Shanghai (CN); Lei Zhang, Richmond Hill (CA); Ji Zhou, Shanghai (CN); Zhong Cai, Shanghai (CN)

(73) Assignees: ADVANCED MICRO DEVICES, INC., Sunnyvale, CA (US); ATI TECHNOLOGIES ULC, Markham, Ontario (CA)

( * ) Notice: Subject to any disclaimer, the term of this patent is extended or adjusted under 35 U.S.C. 154(b) by 219 days.

(21) Appl. No.: 15/491,887

(22) Filed: Apr. 19, 2017

(65) Prior Publication Data
US 2017/0223370 A1 Aug. 3, 2017

Related U.S. Application Data

(63) Continuation of application No. 13/611,959, filed on Sep. 12, 2012, now abandoned.

(51) Int. Cl.
*H04N 19/436* (2014.01)
*H04N 19/15* (2014.01)
(Continued)

(52) U.S. Cl.
CPC .......... *H04N 19/436* (2014.11); *H04N 19/15* (2014.11); *H04N 19/176* (2014.11); *H04N 19/182* (2014.11); *H04N 19/184* (2014.11)

(58) Field of Classification Search
CPC .... H04N 19/436; H04N 19/15; H04N 19/184; H04N 19/182; H04N 19/176; H04N 19/423
See application file for complete search history.

(56) References Cited

U.S. PATENT DOCUMENTS 4,597,016 A * 6/1986 Nakamura ........... H04N 1/4175
382/245
6,160,889 A * 12/2000 Yagasaki ................. G06T 9/007
348/E7.057

(Continued)

OTHER PUBLICATIONS

Zhuo Zhao and Ping Liang, "A Highly Efficient Parallel Algorithm for H.264 Video Encoder," 2006 IEEE International Conference on Acoustics Speech and Signal Processing Proceedings, Toulouse, 2006, pp. V-V.doi: 10.1109/ICASSP.2006.1661319 (Year: 2006).*

(Continued)

*Primary Examiner* — Gims S Philippe
*Assistant Examiner* — Stefan Gadomski
(74) *Attorney, Agent, or Firm* — Volpe and Koenig, P.C.

(57) ABSTRACT

A system and method for providing video compression that includes encoding using an encoding engine a YUV stream wherein Y, U and V color values are encoded in parallel and patching together the Y, U and V color streams to form a compressed YUV output stream. The encoding engine further includes encoding each color value of the YUV stream in parallel using parallel encoding engines and a control engine for controlling operation all of the encoding engines in parallel. The YUV stream has an average bits per pixel value that varies from a first value to a second value that is double the first value. The encoding engine includes encoding the YUV stream in generally the same amount of time regardless of the average bits per pixel value.

20 Claims, 5 Drawing Sheets

(51) Int. Cl.
*H04N 19/176* (2014.01)
*H04N 19/182* (2014.01)
*H04N 19/184* (2014.01)

(56) References Cited

U.S. PATENT DOCUMENTS

| | | | | |
|---|---|---|---|---|
| 6,870,883 | B2* | 3/2005 | Iwata | H04N 19/61 |
| | | | | 375/240.01 |
| 7,460,725 | B2 | 12/2008 | Malladi | |
| 8,165,392 | B2* | 4/2012 | Sekiguchi | H04N 21/236 |
| | | | | 382/166 |
| 8,300,694 | B2* | 10/2012 | Sekiguchi | H04N 19/176 |
| | | | | 375/240.16 |
| 8,300,700 | B2* | 10/2012 | Sekiguchi | H04N 19/176 |
| | | | | 375/240.01 |
| 8,306,112 | B2* | 11/2012 | Sekiguchi | H04N 19/66 |
| | | | | 375/240.1 |
| 8,655,087 | B2* | 2/2014 | Yamada | H04N 21/236 |
| | | | | 382/233 |
| 8,718,139 | B2* | 5/2014 | Yamada | H04N 21/236 |
| | | | | 375/240.12 |
| 9,083,947 | B2* | 7/2015 | Yang | H04N 19/50 |
| 2002/0094031 | A1 | 7/2002 | Ngai et al. | |
| 2005/0036551 | A1* | 2/2005 | Winger | H04N 19/52 |
| | | | | 375/240.16 |
| 2006/0256854 | A1 | 11/2006 | Jiang | |
| 2007/0171975 | A1* | 7/2007 | Smith | H04N 19/159 |
| | | | | 375/240.13 |
| 2008/0123972 | A1* | 5/2008 | Sekiguchi | H04N 21/236 |
| | | | | 382/232 |
| 2008/0137731 | A1 | 6/2008 | Sekiguchi et al. | |
| 2008/0137744 | A1* | 6/2008 | Moriya | H04N 19/105 |
| | | | | 375/240.15 |
| 2008/0253461 | A1 | 10/2008 | Lin et al. | |
| 2009/0041120 | A1* | 2/2009 | Yu | H04N 19/50 |
| | | | | 375/240.12 |
| 2009/0175548 | A1 | 7/2009 | Fukuhara et al. | |
| 2009/0245349 | A1* | 10/2009 | Zhao | H04N 19/70 |
| | | | | 375/240.03 |
| 2009/0257485 | A1* | 10/2009 | Youn | H04N 19/176 |
| | | | | 375/240.01 |
| 2010/0119167 | A1 | 5/2010 | Ikeda et al. | |
| 2010/0225655 | A1 | 9/2010 | Tung et al. | |
| 2011/0235699 | A1 | 9/2011 | Huang et al. | |
| 2012/0014429 | A1* | 1/2012 | Zhao | H04N 19/70 |
| | | | | 375/240.01 |
| 2012/0014431 | A1* | 1/2012 | Zhao | H04N 19/70 |
| | | | | 375/240.02 |
| 2012/0081241 | A1* | 4/2012 | Misra | H03M 7/4093 |
| | | | | 341/107 |
| 2012/0093234 | A1 | 4/2012 | Rosenzweig et al. | |
| 2012/0201294 | A1* | 8/2012 | Segall | H04N 19/119 |
| | | | | 375/240.02 |
| 2012/0230598 | A1 | 9/2012 | Fukuhara et al. | |
| 2013/0003823 | A1* | 1/2013 | Misra | H04N 19/129 |
| | | | | 375/240.02 |
| 2013/0003827 | A1* | 1/2013 | Misra | H04N 19/159 |
| | | | | 375/240.12 |
| 2014/0023286 | A1 | 1/2014 | Du | |

OTHER PUBLICATIONS

Y. Miura and S. Yamato, "Simple compression method for parallel encoding environment of video image," 2009 IEEE Pacific Rim Conference on Communications, Computers and Signal Processing, Victoria, BC, 2009, pp. 284-289.doi: 10.1109/PACRIM.2009.5291359 (Year: 2009).*

J. Franche and S. Coulombe, "A multi-frame and multi-slice H.264 parallel video encoding approach with simultaneous encoding of prediction frames," 2012 2nd International Conference on Consumer Electronics, Communications and Networks (CECNet), Yichang, 2012, pp. 3034-3038. (Year: 2012).*

* cited by examiner

SYSTEM FOR VIDEO COMPRESSION

CROSS REFERENCE TO RELATED APPLICATIONS

This U.S. Non-Provisional patent application is a continuation of U.S. patent application Ser. No. 13/611,959 filed on Sep. 12, 2012, the entire contents of which are hereby incorporated by reference.

FIELD OF INVENTION

The present invention relates to scalable video applications and more specifically to improving high definition compression in scalable video applications.

BACKGROUND

Currently, the remote transfer and display of video data using consumer electronics devices has become a field of significant development. Generally, it is desirable to permit such streaming between devices with different display capabilities. With the advent of different video devices having different video resolutions, it is desirable to compress the video stream thereby increasing the amount of data transmitted to communicate the highest video resolution that can be transferred, yet it is also desirable to permit viewing of such video streams with devices that may only permit lower resolution video streams or may have throughput or slow processing capabilities that render such higher resolution video signals impracticable. These issues have become particularly pronounced with the advent of high definition (HD) video, although the problem should not be construed as being limited to HD video. Thus, scalable video streams are increasing in popularity. In general, a video bit stream is called scalable when parts of the stream can be removed in a way that the resulting substream forms another valid bit stream for some target decoder, and the substream represents the source content with a reconstruction quality that is less than that of the complete original bit stream but is high when considering the lower quantity of remaining data.

The usual modes of compression can result in differences in the amount of time required to encode/decode higher resolution video (which may or may not conform to known "high definition" formats) in comparison to a lower resolution. In systems that support scalable video delays in processing, the video stream for higher resolution video can become a limiting factor in the overall system performance. Thus, the need exists for a way to reduce or eliminate the effects of delays due to compression of video.

SUMMARY OF EMBODIMENTS

A system and method for providing video compression that includes encoding using an encoding engine a YUV stream wherein Y, U and V color values are encoded in parallel and patching together the Y, U and V color streams to form a compressed YUV output stream.

In some embodiments, the encoding engine further includes encoding each color value of the YUV stream in parallel using parallel encoding engines and a control engine for controlling operation all of the encoding engines in parallel.

The YUV stream has an average bits per pixel value that varies from a first value to a second value that is a larger than (e.g., double) the first value. The encoding engine includes encoding the YUV stream in generally the same amount of time regardless of the average bits per pixel value.

In some embodiments the encoding engine includes determining color values while avoiding null value registers and storing the determined color values in at least one buffer.

In some embodiments the encoding engines further includes compressing level and register location of the stored determined color values from the at least one buffer in parallel.

BRIEF DESCRIPTION OF THE DRAWINGS

Other aspects, advantages and novel features of embodiments of the invention will become more apparent from the following detailed description of the invention when considered in conjunction with the accompanying drawings wherein.

DETAILED DESCRIPTION OF THE PREFERRED EMBODIMENT(S)

Embodiments of the invention as described herein provide a solution to the problems of conventional methods. In the following description, various examples are given for illustration, but none are intended to be limiting. Embodiments include implementing a remote display system (either wired or wireless) using a standard, non-custom codec.

For purposes of this description, "H.264" refers to the standard for video compression that is also known as MPEG-4 Part 10, or MPEG-4 AVC (Advanced Video Coding). H.264 is one of the block-oriented motion-estimation-based codecs developed by the ITU-T Video Coding Experts Group (VCEG) together with the ISO/IEC Moving Picture Experts Group (MPEG). However, other video formats could also be employed in alternative embodiments.

Included with in the features of H.264 is Scalable Video Coding (SVC) that is gaining popularity for video conferencing type applications. A number of industry leading companies have standardized (or support the standard) using SVC in the UCIF (Universal Communications Interop Forum) for video conferencing.

The H.264 standard supports the transmission of color video in the 'YUV' color format. In 'YUV,' 'Y' represents the 'luma' value, or brightness, and 'UV' represents the color, or 'chroma' values.

Each unique Y, U and V value comprises 8 bits, or one byte, of data. YUV standards support 24 bit per pixel (bpp) format for the YUV444 standard, 16 per pixel (bpp) format for the YUV422 standard, and 12 bit per pixel (bpp) format for the YUV411 standard and the YUV420 standard. In the YUV422 standard, the U and V color values are shared between every other pixel, which results in an average bit rate of 16. In the YUV411 standard, the U and V color values are shared between every four pixels, which results in an average bit rate of 12. In the YUV420 standard, the U and V color values are shared between every four pixels, which results in an average bit rate of 12, but the YUV are distributed in a reordered format. These bandwidth saving techniques take into account the human eye's lesser sensitivity to variations in color than in brightness.

It will be appreciated by those skilled in the art that the size of YUV444 format video is up to 2 times of the size of the space saving YUV420 format. Even so it is desirable to achieve compression speeds close to the YUV420 standard. Advantageously, some embodiments of the invention give a solution to this by compressing Y/U/V color values at a MacroBlock (MB) level in parallel, and doing reordering by concatenating the MB of the Y color value with its UV color values. It will be appreciated by those skilled in the art that this embodiment is especially useful in large bit rate applications such as giga-bit wireless displays and avoids memory bandwidth consumption.

In the following description, numerous specific details are introduced to provide a thorough understanding of, and enabling description for, embodiments of the implementing low latency applications. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Computers and other such data processing devices have at least one control processor that is generally known as a control processing unit (CPU). Such computers and processing devices operate in environments which can typically have memory, storage, input devices and output devices. Such computers and processing devices can also have other processors such as graphics processing units (GPU) that are used for specialized processing of various types and may be located with the processing devices or externally, such as, included the output device. For example, GPUs are designed to be particularly suited for graphics processing operations. GPUs generally comprise multiple processing elements that are ideally suited for executing the same instruction on parallel data streams, such as in data-parallel processing. In general, a CPU functions as the host or controlling processor and hands-off specialized functions such as graphics processing to other processors such as GPUs.

With the availability of multi-core CPUs where each CPU has multiple processing cores, substantial processing capabilities that can also be used for specialized functions are available in CPUs. One or more of the computation cores of multi-core CPUs or GPUs can be part of the same die (e.g., AMD Fusion™) or in different dies (e.g., Intel Xeon™ with NVIDIA GPU). Recently, hybrid cores having characteristics of both CPU and GPU (e.g., CellSPE™, Intel Larrabee™) have been generally proposed for General Purpose GPU (GPGPU) style computing. The GPGPU style of computing advocates using the CPU to primarily execute control code and to offload performance critical data-parallel code to the GPU. The GPU is primarily used as an accelerator. The combination of multi-core CPUs and GPGPU computing model encompasses both CPU cores and GPU cores as accelerator targets. Many of the multi-core CPU cores have performance that is comparable to GPUs in many areas. For example, the floating point operations per second (FLOPS) of many CPU cores are now comparable to that of some GPU cores.

Embodiments of the present invention may yield substantial advantages by enabling the use of the same or similar code base on CPU and GPU processors and also by facilitating the debugging of such code bases. While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments of the present invention may be used in any computer system, computing device, entertainment system, media system, game systems, communication device, personal digital assistant, or any system using one or more processors. Such embodiments may be particularly useful where the system comprises a heterogeneous computing system. A "heterogeneous computing system," as the term is used herein, is a computing system in which multiple kinds of processors are available.

Embodiments of the present invention enable the same code base to be executed on different processors, such as GPUs and CPUs. Embodiments of the present invention, for example, can be particularly advantageous in processing systems having multi-core CPUs, and/or GPUs, because code developed for one type of processor can be deployed on another type of processor with little or no additional effort. For example, code developed for execution on a GPU, also known as GPU-kernels, can be deployed to be executed on a CPU, using embodiments of the present invention.

Figure 1:
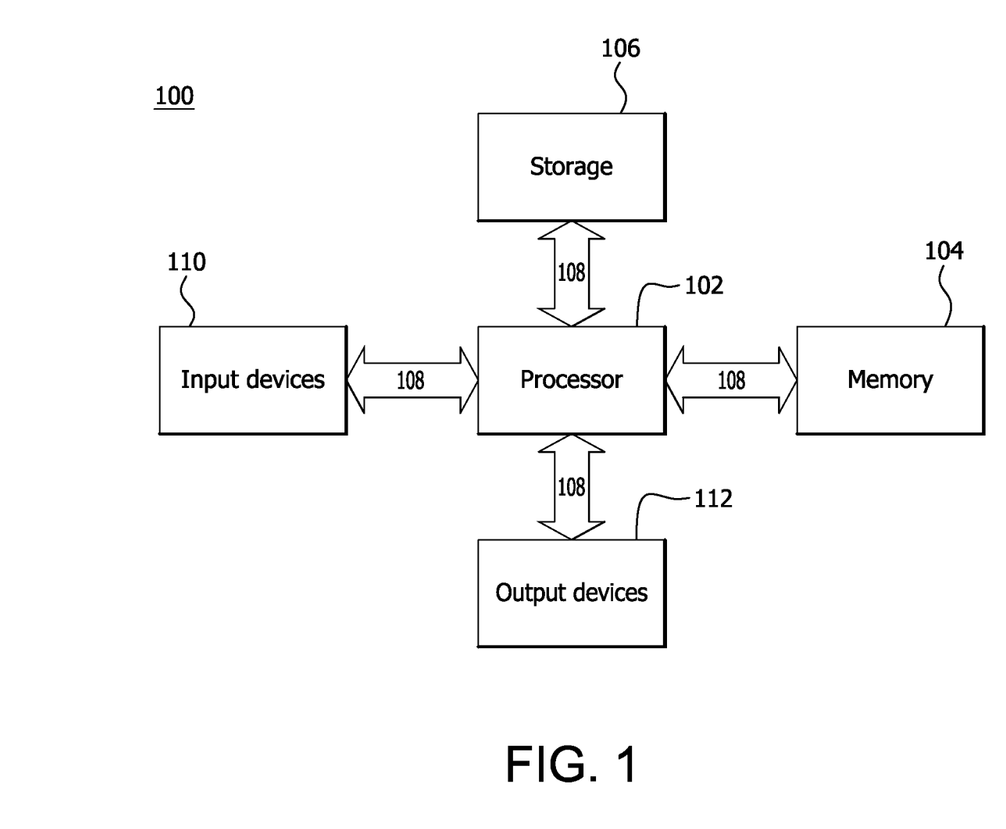
FIG. 1 is a block diagram of a computing system according to an embodiment of the present invention.

An example heterogeneous computing system 100, according to an embodiment of the present invention, is shown in FIG. 1. Heterogeneous computing system 100 can include one or more processing units, such as processor 102. Heterogeneous computing system 100 can also include at least one system memory 104, at least one persistent storage device 106, at least one system bus 108, at least one input device 110 and output device 112.

Figure 2:
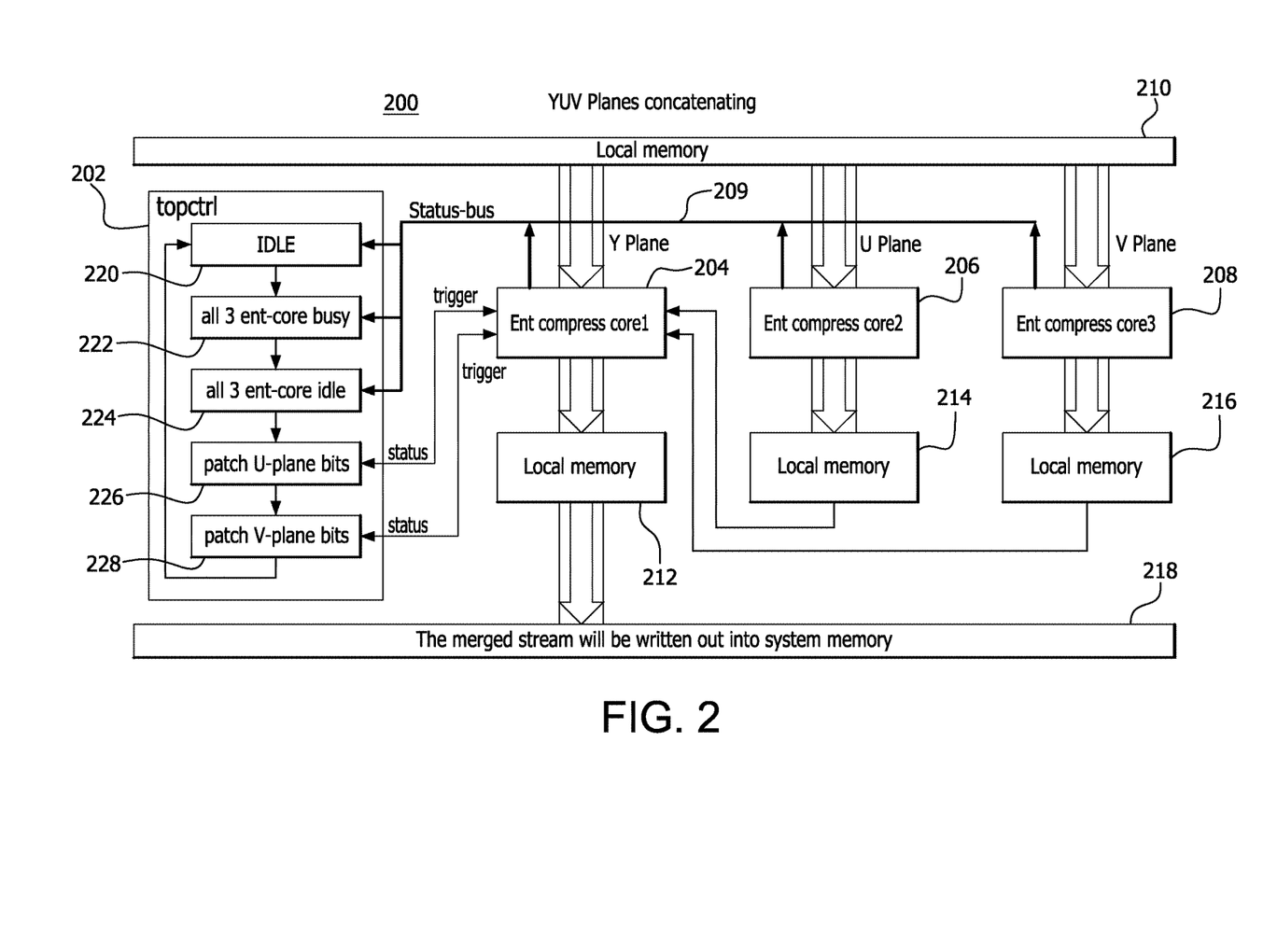
FIG. 2 is a block diagram of an entropy encoding engine according to an embodiment of the present invention.

A processing unit of the type suitable for heterogeneous computing are the accelerated processing units (APUs) sold under various brand names by Advanced Micro Devices of Sunnyvale, Calif. according to an embodiment of the present invention as illustrated by FIG. 2. A heterogeneous processing unit includes one or more CPUs and one or more GPUs, such as a wide single instruction, multiple data (SIMD) processor and unified video decoder perform functions previously handled by a discrete GPU. It will be understood that when referring to the GPU structure and function, such functions are carried out by the SIMD. Heterogeneous processing units can also include at least one memory controller for accessing system memory and that also provides memory shared between the GPU and CPU and a platform interface for handling communication with input and output devices through, for example, a controller hub.

A wide single instruction, multiple data (SIMD) processor for carrying out graphics processing instructions may be included to provide a heterogenous GPU capability in accordance with an embodiment of the present invention or a discrete GPU may be included separated from the CPU to implement the embodiment; however, as will be understood by those skilled in the art, additional latency my be experienced in an implementation of the present invention using a discrete GPU.

Advantageously, architecture of the types described above are well suited to provide a solution for implementing hardware encoding and/or decoding in higher resolution YUV standards, such as YUV444.

In H.264 spec, there are two types of YUV444 video streams supported, namely, a separate-color-plane YUV444 and non-separate-color-plane YUV444, where color is used in this context to also to refer to chroma and color plane is used in this context to also refer to Y/U/V color values. In a separate-color-plane stream, the 3 color values of YUV have no dependency and compress independently, and the 3 color values are joined together into one whole video stream at the end of each slice of video data, where typically, a slice is a frame. In a non-separate-color-plane stream, the 3 color values of Y/U/V are integrated together at each MB level, where a MB level represents a compression unit in the H.264 specification and typically refers to a 16×16 pixel block in one frame, and they share the same prediction-mode.

As described above, the average pixel size of YUV444 format video at 24 bits per pixel is 2 times of the average pixel size of YUV420 format at 12 bits per pixel. Conventionally, the Y/U/V color values are encoded and decoded in a sequential process. To achieve compression speeds close to YUV420, an embodiment of the present invention includes a hardware configuration to compress Y/U/V color values in parallel using 3 encode engines. Each encoder is dedicated to encode one of the Y, U or V color values. For a separate-color-plane stream, this embodiment concatenates the Y/U/V color values at the end of each slice. For a non-separate-color-plane stream, the embodiment concatenates the Y/U/V color values at the end of each MB, where for each MB the Y color value is concatenated with corresponding UV color values.

It will be appreciated that to achieve the parallel compression of each color value in YUV, a re-design of the data-path, pipeline as well as parallelizing the entropy encoding process as much as possible is required to improve the performance.

Furthermore, it has been found that parallel encoding is especially useful in large bit rate applications such as, but not limited to, giga-bit wireless displays. Additionally, it has been found that this solution adapts well with context-adaptive variable-length coding (CAVLC), which is a form of entropy coding used in the H.264 video encoding standard.

In this embodiment of the invention, each Y/U/V color value may be compressed using a base encoding unit, such as a 4×4 pixel block. The entropy encoder includes two data-paths to compress each 4×4 block in parallel.

FIG. 2 shows the block diagram of Y/U/V color values concatenating at the top level in which an exemplary YUV stream is described in connection with the entropy encoding engine 200. The entropy encoding engine includes a top control (topctrl) engine 202 and three encoding engines 204, 206 and 208 connected via a bus 209 to the topctrl engine 202. Each of the encoding engines 204, 206 and 208 receives respective Y, U and V data from a local memory 210 and outputs encoded respective Y, U and V values to respective local buffers 212, 214 and 216. The buffer 212 associated with the Y color value encoder 204 connects directly to the system memory 218 for outputting the final YUV compressed stream. The buffers 214 and 216 for the U and V color values output to the encoder 204 for the Y color value. As the entropy encoding engine 200 will be further described, the exemplary YUV stream is a non-separate-color-plane stream; however, it will be appreciated by those skilled in the art that the same features of the entropy encoding engine 200 may be implemented to process a separate-color-plane stream. In operation, as each MB in the non-separate-color-plane stream becomes available in local memory 210 for processing, the entropy encoder's firmware first checks the status of topctrl engine 202 and the 3 encoding engines 204, 206 and 208 to confirm that they are ready to accept new YUV data, and then the topctrl engine 202 signals the encoding engines 204, 206 and 208 to begin processing new YUV data. When the three encoding engines 204, 206 and 208 get commands to receive the YUV data, the encoding engines 204, 206 and 208 begin to encode simultaneously. Each Y/U/V color value will go into each encoding engine 204, 206 and 208. Each Y/U/V color's output will be written into temporary local memory 212, 214, 216. U and V color values have the same type of local memory 214 and 216, but for the Y color value, the local memory 212 is connected to system memory 218, and the local memory 212 content can be written into system memory 218 automatically.

Monitoring and control of the three encoding engines 204, 206 and 208 at the same time is accomplished by the topctrl engine 202 using the following engines:

a. An Idle Ready engine 220 determines when the entropy encoder 200 is read to accept new data.
b. A busy encoding engine 222 will then check all three encoding engines are all busy.
c. An encoding complete engine 224 then waits and identifies when all three cores are idle.
d. A U color value patching engine 226 then triggers the Y encoding engine 204 to fetch U-color output from U's local memory 214, write the encoded U color value into Y's local memory 212 and wait for the Y encoding engine 204 to finish.
e. A V color value patching engine 228 then triggers the Y encoding engine 204 to fetch V-color output from V's local memory 216, write the encoded V color value into Y's local memory 212 and wait for the Y encoding engine 204 to finish.
f. Upon completion of the V color value patching engine 228, the encode YUV data is written out to the system memory 218 and the topctrl engine 202 returns to the IDLE Ready engine 220 to await the availability of additional YUV color values to begin another MB encoding loop.

It will be appreciated by those skilled in the art that, if the patch engines 226 and 228 delays are ignored, one would measure up to triple the compress speed. Even when accounting for the patch engines 226 and 228, one can measure upwards of 2× speed over a conventional sequential patching method.

Finally for the best performance, an internal buffer may be used for local memory to eliminate data exchanges with external memory can be added. This is also do-able when the hardware is configured with a fast processor or as a heterogeneous computing platform described above.

Figure 3:
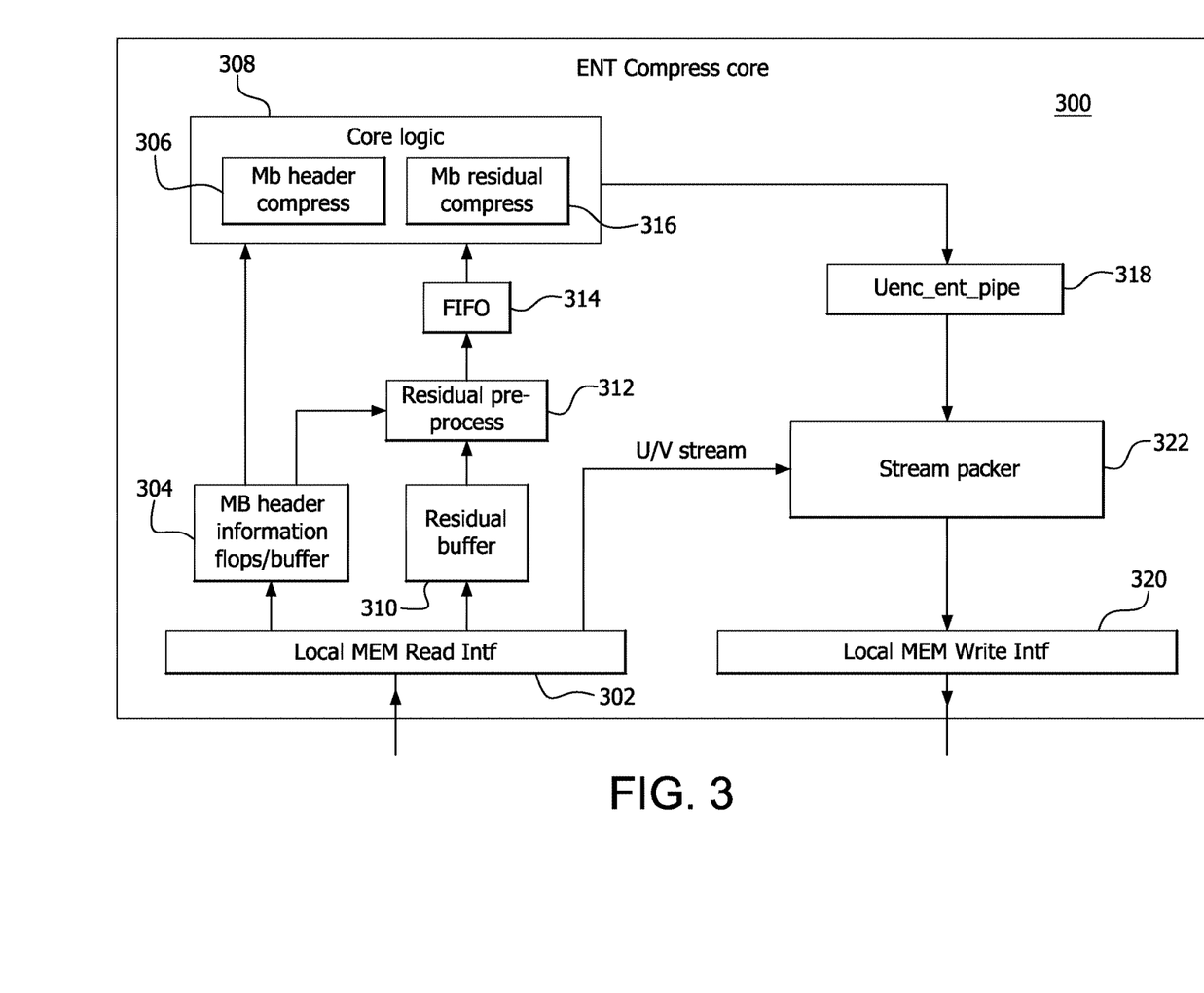
FIG. 3 is a block diagram of an encoding engine according to an embodiment of the present invention.

With reference to FIG. 3, the data-flow for the Y color value encoding engine 300 is shown. Once again the non-separate color stream is used to exemplify the data flow in which a compress unit is one MB in the form of a 16×16 block.

It will be appreciated that in order to speed up each color plane compressing as much as possible, this solution also pipelines the data-path, and makes each pipe-stage delay balanced.

After reading the MB header from local memory 302, the header information will be stored into local flops/buffer 304, and then trigger the MB header compress 306 as part of the compressing engine 308 to begin compression of the header. At the same time, the beginning of header compression is a trigger signal that will also trigger a residual buffer 310 to read residual 4×4 blocks from local memory and store them into the residual buffer.

A Residual-pre-process engine 312 to monitor the status of the residual-buffer 310, once there is one 4×4 block coefficient available and the Residual pre-process engine 312 will read out the 4×4 block, pre-process the data, store the result into a First-In, First-Out (FIFO) buffer 314.

A MB-residual-compress engine 316 within the compressing engine 308 monitors both the MB-header-compress 306 and the FIFO buffer 314 status. When the MB-header-compress 306 is done and there are valid data in the FIFO buffer 314, the -residual-compress engine 316 will begin to compress the residual.

The Probability Interval Partitioning Entropy (PIPE) coding engine 318 is an inserted pipe-stage in order to break the big pipe delay in the data-flow from conventional data flow scenarios.

It will be appreciated by those skilled in the art, that the functionality of the U and V encoding engines 206 and 208 (FIG. 2) have also now been described, where the data from the PIPE is written to the local memory 320. The remaining features described in FIG. 3 are unique to the Y color value encoding engine.

A stream packer engine 322 has two tasks in which one is do some regular processing to conform the encoded YUV stream to by H.264 standard and the other is to sequentially read back the U and then V color values and patch them into the output after Y plane at MB level and written to the local memory 320.

Figure 4:
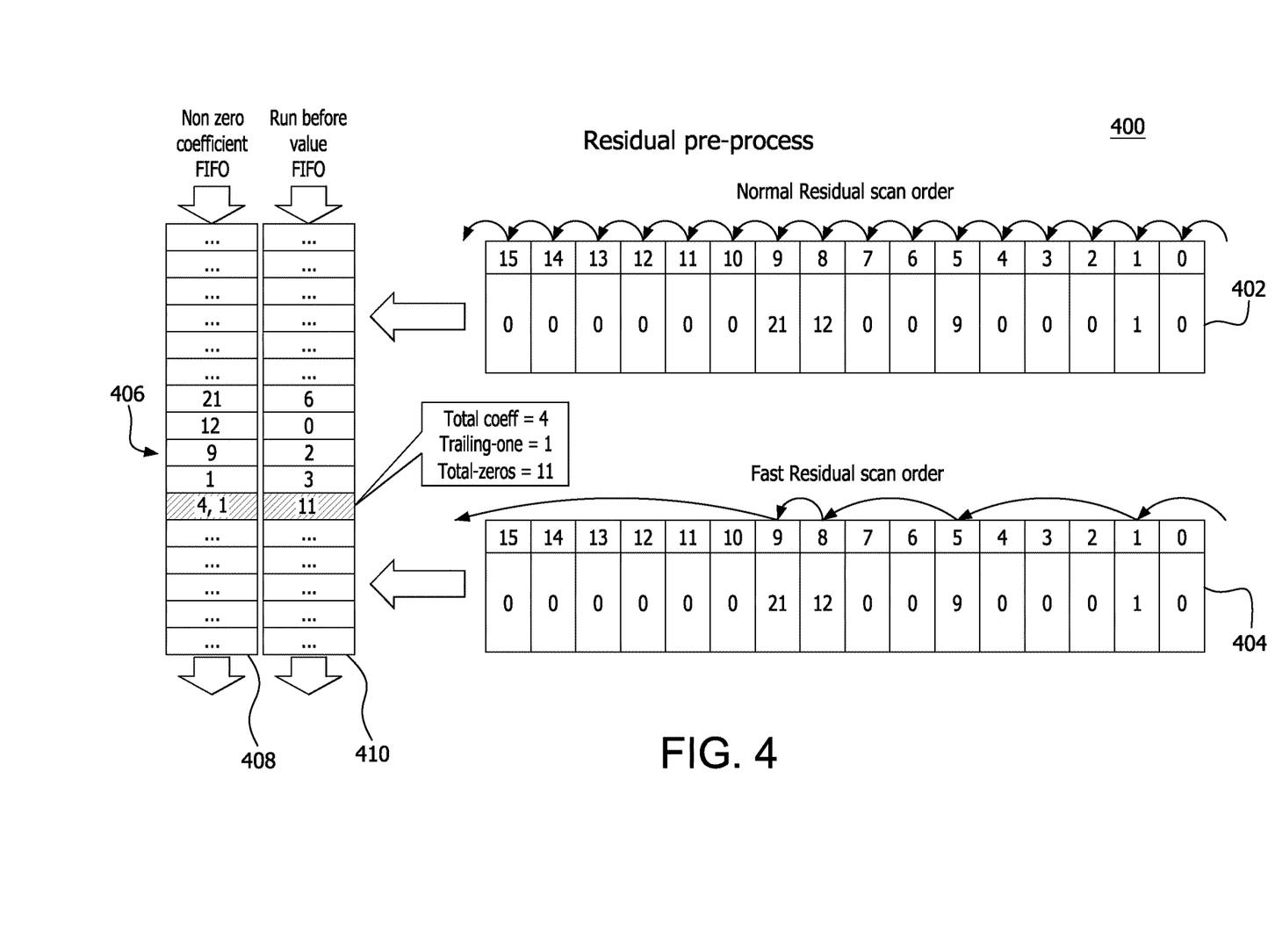
FIG. 4 is a diagram of collecting and buffering YUV color values according to an embodiment of the present invention.

With reference to FIG. 4, an improved process provided by the residual-pre-process engine 312 of FIG. 3 is shown operating on a unit having a 4×4 block of residual data. The residual-pre-process engine 400 first scans the 4×4 2D arrays into 1D array 402 as described in the H.264 standard, and then begins to parse the 16 residuals. In a conventional parsing process, the 16 residuals in the 1 D array 402 is one by one, which need at least 16 cycles to complete one 4×4 blk. In an embodiment, a fast parse process is used, which only parses the non-zero-residuals. By way of example, but not by limitation, a 1 D array 404 having four coefficients with 11 zeros and one trailing zero requires 5 cycles to complete parsing of the 1 D array. The FIFO buffer 406 stores only the data relevant to the residual information including the coefficient value 408 and location 410 based upon intervening zeros.

Figure 5:
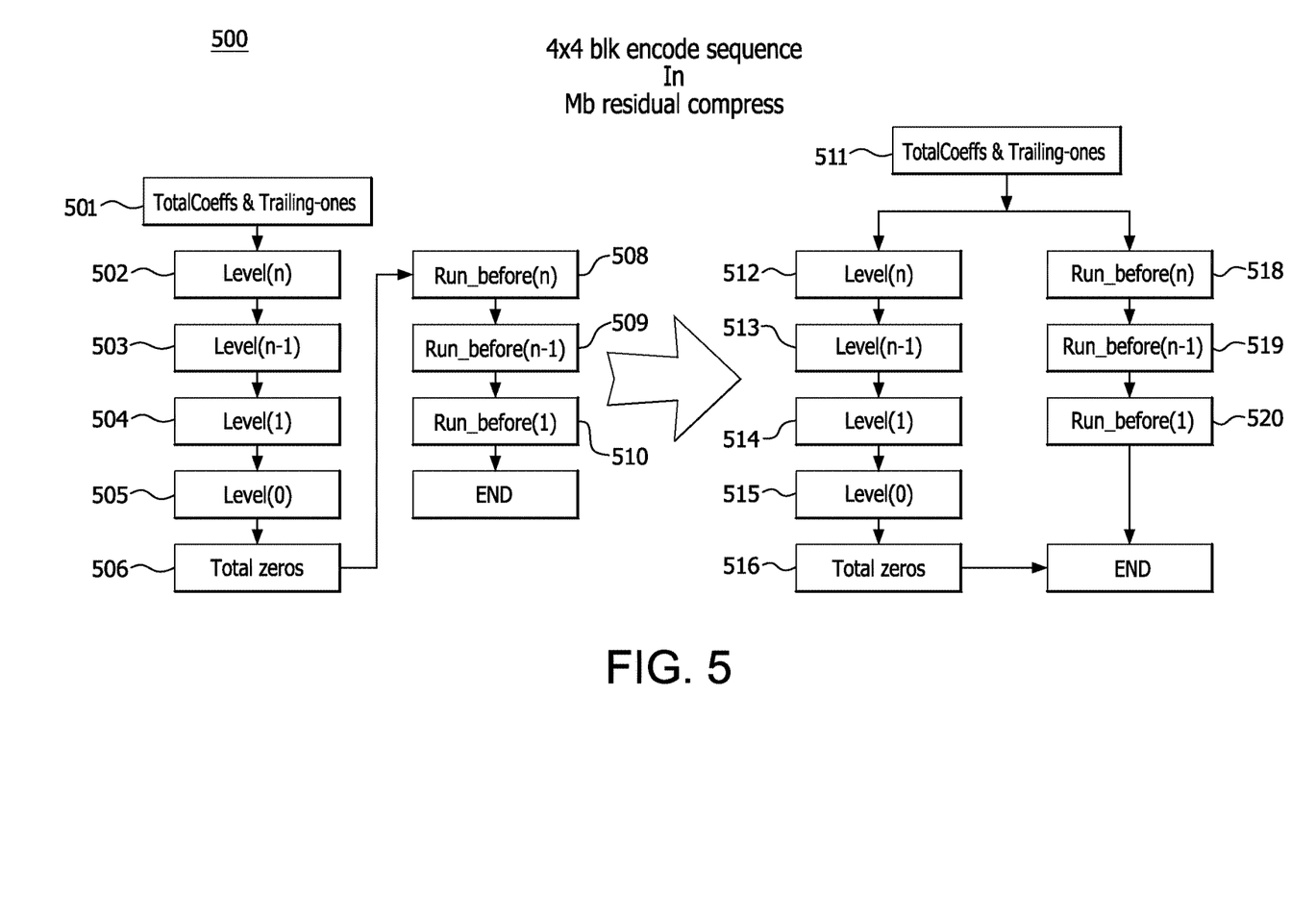
FIG. 5 is diagrammatic view of a MB residual compress engine according to an embodiment of the present invention.

With reference to FIG. 5, a MB residual compress engine 500 is shown. In a conventional embodiment, the level steps 502 to 506 and run_before steps 508 to 510 are compressed sequentially. An embodiment using the improved FIFO buffer 408 (FIG. 4) that includes two FIFO buffers for the coefficient value 408 and location 410 based upon intervening zeros improvement includes level steps 512 to 516 (FIG. 5) and run_before steps 518 to 520 compresses the level and run_before in a parallel process. The run_before compress result will be stored into a local memory, once all the element before run_before are compressed, the data in local-memory will be read out and patch into the stream. It will be appreciated that this implementation the residual-pre-process engine 400 (FIG. 4) and the MB residual compress 500 (FIG. 5) will have similar process time, and make the pipe-line-delay more balanced.

3 Result for Speed

By the improvements described above and while excluding the local memory bandwidth, the entropy encoding speed will be generally totally determined by the kernel engine speed.

Without considering local memory bandwidth, the analyze result as below shows:

$$\text{cycles/mb} = (nzc+6)*(num\_4x4\_blk+1)*1.15 + 100 \text{cycles/header} + \text{UVbits}/10,$$

where "nzc" is the number of non-zero transform coefficient.

Furthermore, it will be appreciated that by implementing this configuration, encoding times for YUV regardless of the whether YUV444 or YUV420 will have approximately the same processing time due to the parallel entropy encoding of the Y, U and V color values.

In another exemplary embodiment, the hardware described above can be implemented using a processor executing instruction from a non-transitory storage medium. Those skilled in the art can appreciate that the instructions are created using a hardware description language (HDL) that is a code for describing a circuit. An exemplary use of HDLs is the simulation of designs before the designer must commit to fabrication. The two most popular HDLs are VHSIC Hardware Description Language (VHDL) and VERILOG. VHDL was developed by the U.S. Department of Defense and is an open standard. VERILOG, also called Open VERILOG International (OVI), is an industry standard developed by a private entity, and is now an open standard referred to as IEEE Standard 1364. A file written in VERILOG code that describes a Joint Test Access Group (JTAG) compliant device is called a VERILOG netlist. VHDL is an HDL defined by IEEE standard 1076.1. Boundary Scan Description Language (BSDL) is a subset of VHDL, and provides a standard machine- and human readable data format for describing how an IEEE Std 1149.1 boundary-scan architecture is implemented and operates in a device. Any HDL of the types described can be used to create instructions representative of the hardware description.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for encoding video data having a luma-chroma format ("YUV format"), the method comprising:
   encoding a U value, by a U-compression core, for a macro block based on data for the macro block to generate U-color output;
   encoding a V value, by a V-compression core, for the macro block based on data for the macro block to generate V-color output;
   encoding a Y value, by a Y-compression core, for the macro block based on data for the macro block to generate Y output;
   for a separate-color-plane stream, patching, by the Y-compression core, the Y output, the U-color output, and the V-color output together at the end of a frame, to generate encoded YUV data; and
   for a non-separate-color-plane stream, patching, by the Y-compression core, a second Y output encoded by the Y-compression core, a second U-color output encoded by the U-compression core, and a second V-color output encoded at the V-compression core at the end of a macroblock, to generate second encoded YUV data;
   wherein encoding the U value, encoding the V value, and encoding the Y value occur simultaneously.

2. The method of claim 1, further comprising:
   responsive to determining that the U-compression core, the V-compression core, and the Y-compression core are idle, triggering the encoding of the U value, the encoding of the V value, and the encoding of the Y value.

3. The method of claim 2, further comprising:
after generating the encoded YUV data, outputting the YUV data to system memory.

4. The method of claim 3, further comprising:
after outputting the YUV data to system memory, determining that the U-compression core, the V-compression core, and the Y-compression core are idle; and
responsive to determining that the U-compression core, the V-compression core, and the Y-compression core are idle, fetching a second macro block for processing.

5. The method of claim 1, wherein encoding the Y value comprises:
initiating compression of a header of the macro block; and
in response to initiating compression of the header of the macro block, triggering a residual buffer to read residual blocks from local memory and store the blocks in the residual buffer.

6. The method of claim 5, further comprising:
reading data for a block from the residual buffer, pre-processing the data, and storing a result of the pre-processing in a first-in-first-out buffer.

7. The method of claim 6, further comprising:
responsive to the result of the pre-processing being available in the first-in-first-out buffer, and responsive to compression of the header of the macro block being complete, compressing the result of the residual pre-processing to generate a compressed pre-processed residual.

8. The method of claim 7, wherein pre-processing the data comprises:
scanning the data for the block into a one-dimensional array; and
parsing data in the one-dimensional array according to a fast-parse technique that parses non-zero-residuals but does not parse zero-residuals.

9. An encoding engine, comprising:
a U-compression core configured to encode a U value for a macro block based on data for the macro block to generate U-color output;
a V-compression core configured to encode a V value for the macro block based on data for the macro block to generate V-color output;
a Y-compression core configured to:
encode a Y value for the macro block based on data for the macro block to generate Y output,
for a separate-color-plane stream, patch, by the Y-compression core, the Y output, the U-color output, and the V-color output together at the end of a frame, to generate encoded YUV data; and
for a non-separate-color-plane stream, patch, by the Y-compression core, a second Y output encoded by the Y-compression core, a second U-color output encoded by the U-compression core, and a second V-color output encoded at the V-compression core at the end of a macroblock, to generate second encoded YUV data;
wherein encoding the U value, encoding the V value, and encoding the Y value occur simultaneously.

10. The encoding engine of claim 9, further comprising:
a top control unit configured to, responsive to determining that the U-compression core, the V-compression core, and the Y-compression core are idle, trigger the encoding of the U value, the encoding of the V value, and the encoding of the Y value.

11. The encoding engine of claim 10, wherein the Y-compression core is further configured to:
after generating the encoded YUV data, output the YUV data to system memory.

12. The encoding engine of claim 11, wherein the top control unit is further configured to:
after outputting the YUV data to system memory, determine that the U-compression core, the V-compression core, and the Y-compression core are idle; and
responsive to determining that the U-compression core, the V-compression core, and the Y-compression core are idle, fetch a second macro block for processing.

13. The encoding engine of claim 9, wherein the Y-compression core is configured to encode the Y value by:
initiating compression of a header of the macro block; and
in response to initiating compression of the header of the macro block, triggering a residual buffer to read residual blocks from local memory and store the blocks in the residual buffer.

14. The encoding engine of claim 13, wherein the Y-compression core is further configured to:
read data for a block from the residual buffer, pre-process the data, and store a result of the pre-processing in a first-in-first-out buffer.

15. The encoding engine of claim 14, wherein the Y-compression core is further configured to:
responsive to the result of the pre-processing being available in the first-in-first-out buffer, and responsive to compression of the header of the macro block being complete, compress the result of the residual pre-processing to generate a compressed pre-processed residual.

16. The encoding engine of claim 15, wherein the Y-compression core is configured to pre-process the data by:
scanning the data for the block into a one-dimensional array; and
parsing data in the one-dimensional array according to a fast-parse technique that parses non-zero-residuals but does not parse zero-residuals.

17. A non-transitory computer-readable medium storing instructions that, when executed by a processor, cause the processor to encode video data having a luma-chroma format ("YUV format") by:
encoding a U value, by a U-compression core, for a macro block based on data for the macro block to generate U-color output;
encoding a V value, by a V-compression core, for the macro block based on data for the macro block to generate V-color output;
encoding a Y value, by a Y-compression core, for the macro block based on data for the macro block to generate Y output;
for a separate-color-plane stream, patch, by the Y-compression core, the Y output, the U-color output, and the V-color output together at the end of a frame, to generate encoded YUV data; and
for a non-separate-color-plane stream, patch, by the Y-compression core, a second Y output encoded by the Y-compression core, a second U-color output encoded by the U-compression core, and a second V-color output encoded at the V-compression core at the end of a macroblock, to generate second encoded YUV data;
wherein encoding the U value, encoding the V value, and encoding the Y value occur simultaneously.

18. The non-transitory computer-readable medium of claim 17, wherein the instruction further cause the processor to:
responsive to determining that the U-compression core, the V-compression core, and the Y-compression core are idle, trigger the encoding of the U value, the encoding of the V value, and the encoding of the Y value.

19. The non-transitory computer-readable medium of claim 18, wherein the instruction further cause the processor to:
after generating the encoded YUV data, output the YUV data to system memory.

20. The non-transitory computer-readable medium of claim 19, wherein the instruction further cause the processor to:
after outputting the YUV data to system memory, determine that the U-compression core, the V-compression core, and the Y-compression core are idle; and
responsive to determining that the U-compression core, the V-compression core, and the Y-compression core are idle, fetch a second macro block for processing.

* * * * *